United States Patent [19]

Belart

[11] 4,400,943

[45] Aug. 30, 1983

[54] BRAKE UNIT FOR AUTOMOTIVE VEHICLES

[75] Inventor: Juan Belart, Walldorf, Fed. Rep. of Germany

[73] Assignee: ITT Industries, Inc., New York, N.Y.

[21] Appl. No.: 239,310

[22] Filed: Mar. 2, 1981

[30] Foreign Application Priority Data

Apr. 5, 1980 [DE] Fed. Rep. of Germany ....... 3013457

[51] Int. Cl.³ .............................................. B60T 13/20
[52] U.S. Cl. .................................... 60/554; 60/547.1; 60/562; 91/369 A
[58] Field of Search ................... 60/547 R, 554, 551, 60/562; 91/369 A

[56] References Cited

U.S. PATENT DOCUMENTS

| 2,900,962 | 8/1959 | Ingres | 60/547 |
| 2,929,215 | 3/1960 | Stelzer | 60/547 |
| 2,929,216 | 3/1960 | Stelzer | 60/553 |
| 2,957,454 | 10/1960 | Stelzer | 60/551 |
| 3,408,815 | 11/1968 | Stelzer | 60/551 |
| 3,564,849 | 2/1971 | Huruta | 60/562 |
| 4,072,014 | 2/1978 | Gardner | 91/369 A |
| 4,282,799 | 8/1981 | Takeuchi | 60/554 |

FOREIGN PATENT DOCUMENTS 44-22133 9/1969 Japan ................................ 60/547 R Primary Examiner—Abraham Hershkovitz
Attorney, Agent, or Firm—John T. O'Halloran; Alfred C. Hill

[57] ABSTRACT

A brake unit for automotive vehicles includes a low-pressure brake booster and hydraulic tandem brake master cylinder fastened thereto between the splashboard of the vehicle and the brake booster. The brake pedal force is transmitted via a pressure sleeve extending through a primary piston and a secondary piston of the master cylinder onto a control valve disposed inside the booster. The boosting force generated by a movable wall of the booster is transmitted via an annular reaction disc of elastic material, which is disposed in a hub member of the movable wall, via an adjustable stop nut onto a central tie rod. The tie rod at the pedal-side end thereto is in engagement with the primary piston of the master cylinder by means of a radial extension.

30 Claims, 8 Drawing Figures

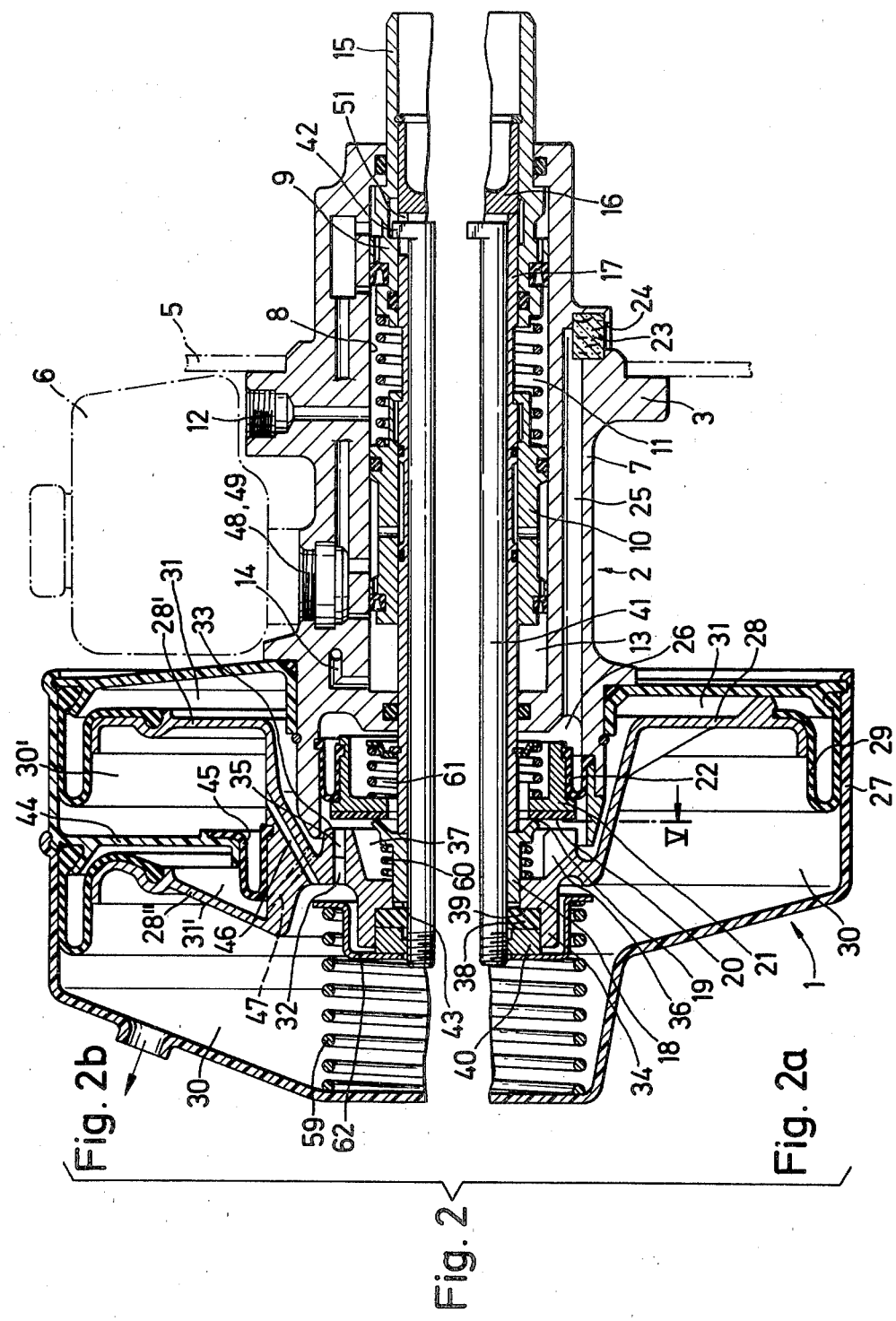

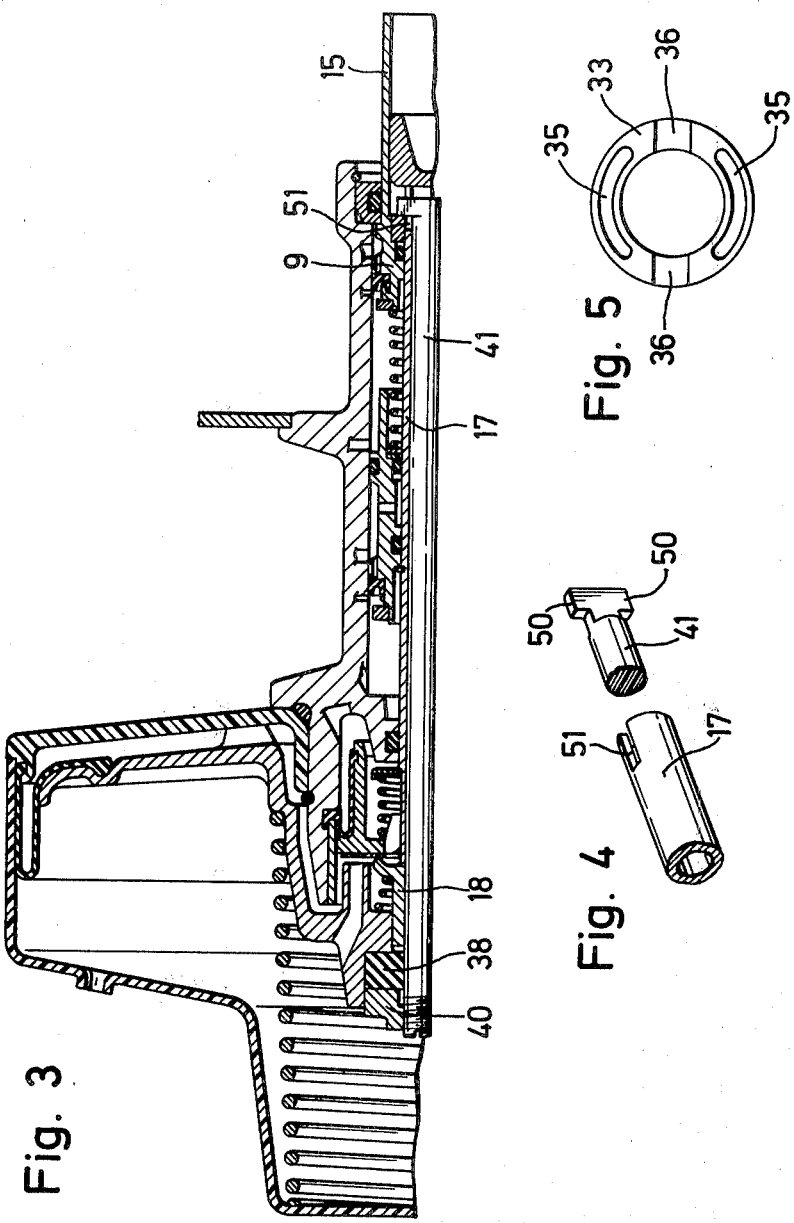

BRAKE UNIT FOR AUTOMOTIVE VEHICLES

BACKGROUND OF THE INVENTION

The present invention relates to a brake unit for automotive vehicles comprising a fluid-actuated brake booster and a master brake cylinder secured thereto, at whose end remote from the brake booster the brake-pedal force is introduced. The brake-pedal force is transmitted via a pressure member penetrating a piston of the master brake cylinder onto a control element of a control valve disposed in the brake booster, which controls the fluid supply to the brake booster. A tie element transmits the brake-boosting force from a fluid-actuated movable wall of the brake booster onto the piston of the brake master cylinder, and with a reaction device which—dependent upon the brake-boosting force—transmits a reaction force directed in opposition to the brake-pedal force onto the pressure member.

Brake units of this type serve to boost the pedal force applied by a brake pedal and to transform it to a hydraulic actuating pressure generated in the brake master cylinder for one or several brake circuits. In contrast to a travel-responsive brake-boosting operation, in which only the actuating position of the brake pedal determines the magnitude of the braking force generated, without the driver getting a feeling for the magnitude of the braking force generated, in a force-responsive brake booster, a reaction force responsive to the generated braking force will be produced through the reaction device, which counteracts the pedal force and gives the driver a feeling for the magnitude of the braking force generated. At the same time, this reaction force operates, in opposition to the actuating direction, on the control valve initiating the brake-boosting operation, so that a boosting effect initially achieved will be interrupted, if the driver does not move the brake pedal further in opposition to the reaction force occurring by applying a higher amount of pedal force.

In a brake unit of the type referred to hereinabove, such as, for example, U.S. Pat. No. 2,929,216, the actuating member or pressure member is constructed as a push rod which is encompassed by a tie sleeve forming the tie element. The reaction device includes an annular piston subjected to the hydraulic brake pressure generated, which piston transmits the reaction force via a compression spring and, after having overcome the spring force, via a stop onto the push rod and thus—in opposition to the pedal force—onto the brake pedal. The known brake unit which incorporates a high-pressure brake booster is of a comparatively complicated structure. The reaction force obtained by hydraulic transmission acts in two steps and, therefore, is not proportional to the braking force generated. Since a separate piston, which is located in the brake master cylinder, is necessary for the generation of the reaction force, the space required in the brake master cylinder and the structural space needed therefore will be essentially increased.

Since in the case of the known brake unit, the reaction force is generated by direct application of hydraulic pressure on an effective surface connected with the push rod, this brake unit is only able to be employed for a single-circuit brake master cylinder. In a dual-circuit brake master cylinder, each of the two brake circuits would have to be provided with a separate hydraulic effective surface at which the reaction force is generated. If the hydraulic effective surface destined to produce the reaction force were located in one of the two brake circuits only, no reaction force at all would be generated upon failure of this brake circuit. The arrangement of two effective surfaces each assigned to a different one of the two brake circuits, would, at the most, be possible to be obtained by great structural effort. However, there would in any case take place a substantial decrease in the reaction effect upon failure of one of the two brake circuits.

In brake units known in various designs, for example German Patent DE-OS No. 2,837,911, the brake master cylinder is located on the side of the brake booster remote from the pedal side. In this arrangement, a reaction disc composed of a rubber-elastic material is employed to generate the reaction force reacting on the brake pedal, which reaction disc is compressed at its outer periphery by the force transmitted between the movable wall of the brake booster and a push rod leading to the brake master cylinder. The material displaced by the quasi-hydraulic behavior of the reaction disc presses against a control valve piston force-transmittingly connected with the brake pedal and generates the reaction force sensed by the driver.

This known reaction device is of a comparatively straightforward design. It hardly changes the overall length of the brake unit. However, difficulties are encountered with the length adjustment required for the compensation of tolerances. With this type of a brake unit, problems arise by the brake master cylinder being arranged on the side of the brake booster remote from the pedal side, so that considerable forces have to be transmitted via the housing of the brake booster, or via separate tension-transmission elements which may be constructed, for instance, as tie rods or as a central tube.

SUMMARY OF THE INVENTION

It is, therefore, an object of the present invention to provide a brake unit of the type referred to hereinabove enabling a comparatively straightforward construction, a short overall length, and a dual-circuit brake master cylinder without impairing the effectiveness of the reaction device even upon failure of a brake circuit.

A feature of the present invention is the provision of a brake unit for an automotive vehicle comprising a fluid actuated brake booster and a brake master cylinder secured thereto between a splashboard of the vehicle and the booster, a brake-pedal force being introduced into the master cylinder at one end thereof remote from the booster; a hollow pressure member extending through a piston of the master cylinder to transmit the pedal force to a control element of a control valve disposed in the booster, the control valve controlling fluid supply to the booster; a reaction device disposed in the area of at least one fluid-actuated movable wall of the booster to transmit a reaction force dependent upon a brake boosting force generated by the movable wall onto the pressure member in opposition to the pedal force; and a tie element extending through the pressure member and the reaction device to transmit the boosting force onto the piston, the tie element carrying on its end disposed in the booster a stop disc against which the reaction device bears in the direction of the pedal force.

Since the reaction device is disposed outside of the brake master cylinder and is independent of the hydraulic pressure in the brake master cylinder, it is possible without any difficulties as to construction to construct the brake master cylinder as a tandem brake master cylinder for a dual-circuit brake system. The transmission ratio of the reaction device will remain unchanged even in the event of failure of a brake circuit. The reaction device and the entire brake unit are of a comparatively simple construction. The brake master cylinder remains unchanged in comparison with conventional designs—apart from the guiding of the pressure member through the piston.

According to a preferred embodiment of the present invention, the pressure member is a pressure sleeve communicating with the control element constructed as a control valve piston, the pressure sleeve encompassing the tie element formed as a tie rod. The tie rod is on its pedal-side end in engagement with the piston of the brake master cylinder through at least one recess of the pressure sleeve. This concentric construction of tie rod with pressure sleeve is particularly space-saving and facilitates the assembly to a great extent.

Improving upon the concept of the invention, the brake master cylinder is constructed as a tandem brake master cylinder with a primary piston and a secondary piston, with the pressure member extending through the primary piston and the secondary piston and the tie element extending at least through the secondary piston and is in engagement with the primary piston. Constructing the brake master cylinder as a tandem brake master cylinder involves no difficulties, since the tie element and the pressure member may extend through the piston of the tandem brake master cylinder without special effort by constructing both pistons of the tandem brake master cylinder as annular pistons.

A further embodiment of the present invention provides that the reaction disc is located in a hub member of the movable wall of the brake booster, that a stop surface of the movable wall is constructed as an outer annular surface and that a stop surface of the pressure member is an inner annular end surface of the control valve piston, which end surface is spaced from the reaction disc in the off position. Within the hub of the movable wall which is required anyway, the reaction device occupies no additional space and it is both easily accessible and adjustable.

The compensation for manufacturing tolerances may be effected in a very simple manner by axially adjusting the stop disc, which is connected to the tie element led through the brake unit, which tie element transmits the boosting force from the movable wall of the brake booster onto the piston of the brake master cylinder. The adjustable stop disc is easily accessible and is therefore able to be adjusted in a simple way during the assembly of the brake unit prior to closing the housing of the brake booster, without the necessity of measuring the brake unit and inserting separate intermediate elements for the compensation of tolerances. Also a subsequent adjustment is possible in an easy way. Since the reaction disc is disposed in the area of the movable wall of the brake booster, the overall length of the brake unit will not be increased by the reaction device.

By a particularly simple method, the adjustability of the stop disc is accomplished in that the stop disc is a stop nut screwed onto the tie rod, the stop nut being screwed onto the tie rod until the desired standard is achieved at the sealing surfaces in the control valve. Preferably, the stop nut is a self-locking nut so that no special locking mechanism will be required after the adjustment.

The transmission of the boosting force from the tie rod to the master cylinder piston can be effected in a very simple way by constructing the tie rod at its pedal-side end like a hammer head having two radial extensions, with each of the extensions extending through a slot, open on the pedal side, of the pressure sleeve and engaging behind the primary piston of the brake master cylinder.

In the case of the brake booster being constructed as a low-pressure booster, the arrangement in accordance with the present invention permits a tandem version by very simple structural means, with two movable walls which are connected to a common hub member being arranged in tandem. The tandem version enables the achievement of a higher amount of boosting force without increasing the diameter of the booster housing.

For this arrangement, it is particularly expedient to connect the hub member of the brake booster via a rolling diaphragm with a stationary housing wall of the brake booster in the area between the two movable walls. This obviates the need for a slide seal which is more susceptible to interference with movement of the movable walls.

In addition to the already very short overall length of the brake unit in accordance with the present invention, the space required in the engine compartment of the automotive vehicle can be further reduced a great deal since a pedal-side section of the brake master cylinder projects through a splashboard of the automotive vehicle carrying the brake unit into the interior of the vehicle, where there is sufficient space available beneath or behind the brake pedal, which space is conventionally bridged by a push rod.

In the case of the brake booster being constructed in a conventional manner as a low-pressure booster and including a working chamber connectible to atmosphere on its side close to the brake master cylinder, in accordance with the present invention, this working chamber can be connected via the control valve and a longitudinal channel located in the housing of the brake master cylinder to an air intake port located on the pedal side in front of the splashboard. While in a version of the brake unit the booster housing is placed directly at the splashboard, with no difficulties being involved in general with the inlet of air from the vehicle's interior to supply the working chamber of the low-pressure booster with, the brake booster in the brake unit in accordance with the present invention is spaced from the splashboard. The suggested arrangement of a longitudinal channel in the housing of the brake master cylinder procures an air intake connection to the vehicle's interior without essential additional structural arrangements.

Instead of this, the air intake port can also be located between the cylinder bottom and a cylinder housing of the brake master cylinder. In these two aforesaid versions, the air intake port or the air channel does not affect the consturction and the mounting of the booster housing to the brake master cylinder. This is particularly important, if the booster housing is made of plastics, which is favorably and without difficulty possible in the brake unit in accordance with the present invention, since the booster housing has to absorb only comparatively small forces.

In contrast to this, a further reduction of the overall length can be attained in that the air inlet port is arranged in the end wall of the booster housing, which wall communicates with the brake master cylinder, and is connectible via an air channel to the control valve and the working chamber.

An improvement of the present invention includes a control valve including an axially movable control valve body, the sealing end surface of which abuts an annular control edge of the control valve piston as well as with a concentric sealing surface at the hub member of the movable wall. The sealing surface of the hub member incorporates therein two air passages each being circular and leading to a low-pressure chamber of the brake booster and that the sealing surface of the hub member is interrupted in each case between the two air passages for the formation of a radial channel which leads to the working chamber of the brake booster. This provides realization of the necessary control functions in a very confined space without the flow channels, which cross each other in the area of the sealing surface of the hub member, interfering with one another.

In the construction of the brake master cylinder as a tandem brake master cylinder, both ports of the hydraulic fluid reservoir can be placed in a normal plane relative to the longitudinal axis of the brake master cylinder. Thus, the space required between the splashboard and the pedal-side end wall of the booster housing can be very small.

In a preferred embodiment of the present invention, the reaction device includes a circular reaction disc of rubber-elastic material, through which the tie element extends and which is located between the stop disc on the one hand and stop surfaces of the movable wall and of the pressure member on the other hand. The reaction device is completely independent of the hydraulic pressure in the brake circuits in this structure. It requires only very little space and renders it possible to pass the tie element therethrough in a very simple manner.

BRIEF DESCRIPTION OF THE DRAWING

Above-mentioned and other features and objects of this invention will become more apparent by reference to the following description taken in conjunction with the accompanying drawing, in which:

FIG. 2a is a longitudinal cross-sectional view of a brake unit in accordance with the principles of the present invention having only one movable wall in the brake booster;

FIG. 2b is a longitudinal cross-sectional view of a second embodiment of the brake unit in accordance with the principles of the present invention having a tandem brake booster with two movable walls;

FIG. 3 is a longitudinal cross-sectional view of a third embodiment of a brake unit in accordance with the principles of the present invention;

FIG. 4 is a perspective exploded illustration of the pedal-side end of the tie rod and of the pressure sleeve of the brake unit according to FIG. 3;

FIG. 5 is a view of the sealing surface of the hub member of the movable wall of the brake booster in direction of the arrow V in FIG. 2;

DESCRIPTION OF THE PREFERRED EMBODIMENTS

Figure 1:
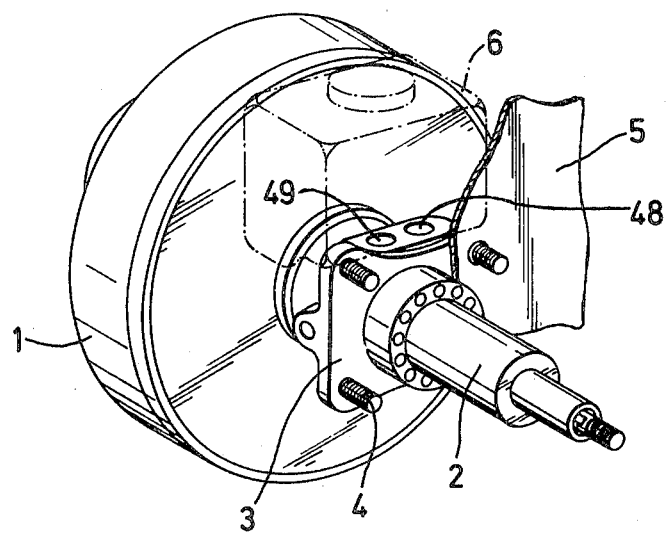
FIG. 1 is a perspective view of a brake unit in accordance with the principles of the present invention.

The brake unit shown in FIG. 1 includes basically a brake booster 1 and a brake master cylinder 2 fastened thereto which is able to be fastened by a flange 3 to a splashboard 5 of an automotive vehicle by means of bolts 4. A reservoir 6 for hydraulic fluid placed above the brake master cylinder 2 is indicated in FIG. 1 by dash-dot lines only. As may be seen in FIG. 1, a portion of brake master cylinder 2 extends through splashboard 5.

Referring to FIG. 2, a primary piston 9 and a secondary piston 10 are slidably arranged in a cylindrical bore 8 of a cylindrical housing 7 of brake master cylinder 2. The hydraulic pressure generated by primary piston 9 in a primary chamber 11 is supplied to a first brake circuit via a connecting bore 12. At the same time, the pressure generated in primary chamber 11 acts on secondary piston 10 which is also named floating piston. Secondary piston 10 likewise builds up a hydraulic pressure in a secondary chamber 13, said pressure being fed via a channel 14 to a second brake circuit.

Primary piston 9 is connected with a guide sleeve 15 which projects from brake master cylinder 2. Arranged movably inside guide sleeve 15 is a sleeve 16 acted upon by a push rod of a brake pedal (not shown). Sleeve 16 bears axially against the pedal-side end of a pressure sleeve 17, which extends up to the area of brake booster 1 to a control valve piston 18. Piston 18 has an annular control edge 19 abutting a sealing end surface 20 of an axially movable control valve body 21 which is movably sealed relative to the end of cylinder housing 7 by means of a rolling diaphragm 22.

An air intake port 24 which is located on the pedal side relative to splashboard 5 and equipped with a filter 23 is connected to a control chamber 26 via a longitudinal channel 25 in cylinder housing 7.

Brake booster 1 includes a booster housing 27 which is made of plastics in the embodiment illustrated. Booster housing 1 is subdivided into a low-pressure chamber 30 and a working chamber 31 by means of a movable wall 28 which is sealed at its outer rim in housing 27 by means of a rolling diaphragm 29.

In the rest position illustrated in FIG. 2, low-pressure chamber 30 communicates with working chamber 31 through air channels 32 which open in a concentric sealing surface 33 of a hub member 34 into circular air passages 35 (see also FIG. 5). Sealing surface 33 of hub member 34 is interrupted in each case between the two air passages 35 for the formation of a radial channel 36 which connects working chamber 31 to a chamber 37 surrounding valve piston 18.

When pressure sleeve 17 is displaced from the rest position shown in FIG. 2 to the left by the initial actuation of the brake pedal, control valve body 21 will move to the left, too, because it follows control valve piston 18, until sealing end surface 20 abuts sealing surface 33 of hub member 34 and closes air passages 35. This causes interruption of the connection between working chamber 31 and low-pressure chamber 30.

In case a higher braking force is exerted by the brake pedal, control edge 19 of control valve piston 18 will be lifted from sealing end surface 20 of control valve body 21, so that the air being subjected to atmospheric pressure in pressure chamber 26 is permitted to propagate into chamber 37 and from there through channels 36 into working chamber 31. This causes movable wall 28 (the embodiment illustrated in FIG. 2a) to move to the left.

Located in hub member 34 of movable wall 28 is a circular reaction disc 38 including a rubber-elastic material, which reaction disc is axially acted upon by a stop surface 39 of hub member 34 and is urged against a stop nut 40, which is screwed on a tie rod 41 arranged in pressure sleeve 17. At its pedal-side end, tie rod 41 has a radial extension 42 extending through a slot 51 of pressure sleeve 17 and is in engagement with primary piston 9. The boosting force exerted by movable wall 28 is in this way transmitted onto primary piston 9.

The boosting force causes compression of reaction disc 38 in its outer area. The elastic material displaced by this action acts on the annular end surface 43 of the control valve piston 18, which surface is in this state abutting reaction disc 38 as well, and presses control valve piston 18 to the right in opposition to the pedal force, until its control edge 19 will move into abutment with sealing end surface 20 and interrupt the inflow of air under atmospheric pressure to working chamber 31.

In the embodiment illustrated, stop nut 40 is constructed as a self-locking nut, which is secured in the desired screw-in position on tie rod 41.

Brake booster 1 is shown in a tandem construction in FIG. 2b. Two movable walls 28' and 28" are connected with hub member 34. Arranged in housing 27 between the two movable walls 28' and 28" is a stationary housing wall 44 which communicates in a sealed relationship with hub member 34 via a rolling diaphragm 45. This provides formation of a second low-pressure chamber 30' between housing wall 44 and movable wall 28' which is connected to working chamber 31 via an air channel 46. Formed between housing wall 44 and movable wall 28" is a second working chamber 31' which is connected to working chamber 31 via an air channel 47 shown by dot-dash lines.

A compression spring 59 which bears with its one end against the booster housing 27 presses via a bell-shaped plate 62 on stop nut 40 and moves movable wall 28 or movable walls 28' and 28" in an unloaded state into the initial position shown in FIG. 2.

A valve piston spring 60 located between hub member 34 and control valve piston 18 keeps control valve piston 18 in abutment with pressure sleeve 17. In the opposite position, a valve body spring 61 supported at pressure sleeve 17 urges control valve body 21 with its sealing end surface 20, which carries a sealing lining, against sealing surface 33 or annular control edge 19 of control valve piston 18. Valve piston spring 60 has a greater spring force than valve body spring 61.

Hydraulic fluid reservoir 6 is connected to secondary chamber 13 and primary chamber 11 of brake master cylinder 2 via two ports 48 and 49 (FIG. 1), which are placed in series in a plane perpendicular to the longitudinal axis of brake master cylinder 2, e.g. in FIG. 2, via channels and bores.

The embodiment illustrated in FIGS. 3 and 4 differs from the embodiment described with respect to FIG. 2 basically only in that tie rod 41 has a hammer-head-like construction at its end close to the pedal side. Tie rod 41 has two radial extensions 50 which project through a slot 51, open on the pedal side, of pressure sleeve 17 and engage behind primary piston 9 which continues as a guide sleeve 15 as in the case of the embodiment according to FIG. 2.

Common to the embodiments according to FIGS. 2 and 3, the brake unit remains operable upon failure of brake booster 1, for instance, upon failure of the low-pressure supply. The brake is able to be actuated by the pedal, though by increased pedal effort. The force exerted on pressure sleeve 17 is transmitted via control valve piston 18, reaction disc 38 and stop nut 40 onto tie rod 41 and from there onto primary piston 9.

Figure 6:
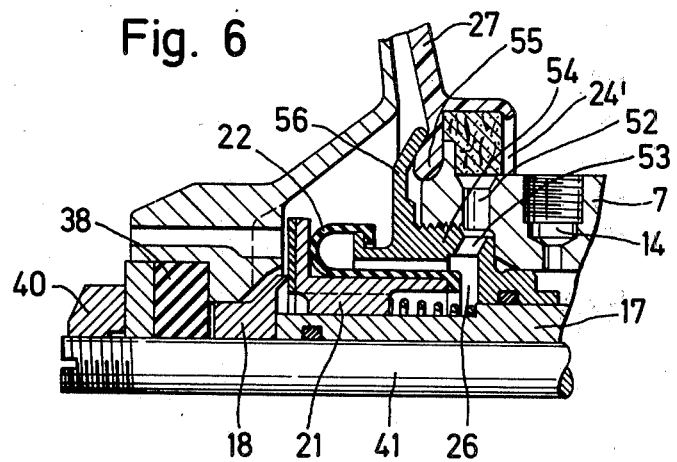
FIG. 6 is a partial cross-sectional view of a brake unit in the area of the air inlet.

FIG. 6 shows a modified embodiment of the air supply. In this arrangement, the air intake ports 24' are disposed at the end of brake master cylinder 2 close to booster 1. The air gets into chamber 26 through bores 52 in housing 7 and through bores 53 in a screwed-in housing bottom 54.

FIG. 6 also shows a favorable fastening of the end wall of booster housing 27, which end wall is composed of plastics. The end wall is equipped with an inner bead 55, which is clamped between master cylinder housing 7 and an outwardly extending flange 56 of the screwed-in housing bottom 54.

Figure 7:
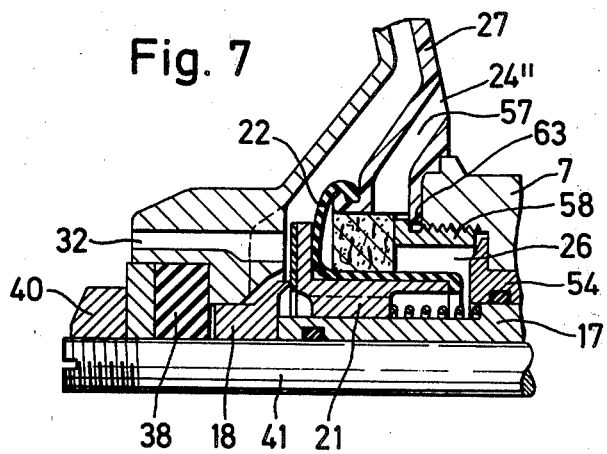
FIG. 7 is a partial cross-sectional view of a modification of FIG. 6.

A short overall length is able to be obtained with the embodiment according to FIG. 7. In this case, the air intake ports 24" are provided on either end side at booster housing 27 and communicate with the chamber 26 via air channels 57. An inner rim 63 of booster housing 27 is fastened to master cylinder housing 7 by means of a nut 58 which is screwed thereinto.

While I have described above the principles of my invention in connection with specific apparatus, it is to be clearly understood that this description is made only by way of example and not as a limitation to the scope of my invention as set forth in the objects thereof and in the accompanying claims.

I claim:

1. A brake unit for an automotive vehicle comprising:
   a fluid-actuated brake booster and a brake master cylinder secured thereto between a splash-board of said vehicle and said booster, a brake-pedal force being introduced into said master cylinder at one end thereof remote from said booster;
   a hollow pressure member extending through a piston of said master cylinder to transmit said pedal force to a control element of a control valve disposed in said booster, said control valve controlling fluid supply to said booster;
   a reaction device disposed in the area of at least one fluid-actuated movable wall of said booster to transmit a reaction force dependent upon a brake boosting force generated by said movable wall onto said pressure member in opposition to said pedal force; and
   a tie element extending through said pressure member and said reaction device to transmit said boosting force onto said piston, said tie element carrying on its end disposed in said booster a stop disc against which said reaction device bears in the direction of said pedal force, said stop disc being an axially adjustable stop nut screwed onto said tie element.

2. A brake unit according to claim 1, wherein said pressure member is a pressure sleeve communicating with said control element in the form of a control valve piston, said sleeve encompassing said tie element in the form of a tie rod, said tie rod adjacent said one end of said master cylinder being in engagement with said piston through at least one slot in said sleeve.

3. A brake unit according to claim 2, wherein said tie rod adjacent said one end of said master cylinder is constructed like a hammer head having two radial extensions each of which extend through an associated slot open toward said one end of said master cylinder, each of said extensions engaging said piston adjacent said one end of said master cylinder.

4. A brake unit according to claim 1, wherein said master cylinder is a tandem brake master cylinder having a primary piston and a secondary piston disposed in tandem, said primary piston being disposed adjacent said one end of said tandem master cylinder and said secondary piston being disposed intermediate said primary piston and said booster, said pressure member extending through said primary and secondary pistons and said tie member extending through at least said secondary piston and engaging said primary piston.

5. A brake unit according to claim 4, wherein
said primary piston defines a boundary of a primary chamber, said secondary piston defines a boundary of a secondary chamber, and further including
a hydraulic fluid reservoir communicating with said primary chamber and said secondary chamber via two ports disposed in a plane perpendicular to a longitudinal axis of said tandem master cylinder.

6. A brake unit according to claim 1, wherein
said reaction device is disposed in a hub member of said movable wall, and
further including
a stop surface for said movable wall abutting an outer portion of said reaction device in a rest position in the form of an annular surface in said hub member, and
a stop surface for said pressure member capable of abutting an inner portion of said reaction device in the form of an annular end surface of said control element spaced from said reaction device in said rest position.

7. A brake unit according to claim 1, wherein
said stop nut is a self-locking nut.

8. A brake unit according to claim 1, wherein
said brake booster is a low-pressure booster having two movable walls in a tandem relationship connected to a common hub member.

9. A brake unit according to claim 8, further including
a stationary housing wall disposed between said two movable walls, said stationary wall and said hub member being interconnected by a rolling diaphragm.

10. A brake unit according to claim 1, wherein
a portion of said master cylinder adjacent said one end thereof projects through said splashboard.

11. A brake unit according to claim 1, wherein
said booster is a low-pressure booster having a working chamber connected to atmosphere via said control valve and a longitudinal channel disposed in a housing of said master cylinder between said control valve and an air intake port disposed on the side of said splashboard remote from said booster.

12. A brake unit according to claim 1, wherein
said booster is a low-pressure booster having a working chamber connected via said control valve to an air intake port disposed in a housing of said master cylinder adjacent said booster.

13. A brake unit according to claim 1, wherein
said booster is a low-pressure booster having a working chamber connected via said control valve to an air intake port disposed in an end wall of a housing of said booster adjacent said master cylinder.

14. A brake unit according to claim 1, wherein
said control valve includes an axially movable control valve body having a sealing end surface capable of abutting an annular control edge of said control element and a concentric sealing surface of a hub member of said movable wall, said concentric sealing surface having two air passages each being partially circular leading to a low-pressure chamber of said booster and a radial channel disposed between each end of said two air passages leading to a work chamber of said booster.

15. A brake unit for an automotive vehicle comprising:
a fluid-actuated brake booster and a brake master cylinder secured thereto between a splashboard of said vehicle and said booster, a brake-pedal force being introduced into said master cylinder at one end thereof remote from said booster;
a hollow pressure member extending through a piston of said master cylinder to transmit said pedal force to a control element of a control valve disposed in said booster, said control valve controlling fluid supply to said booster;
a reaction device disposed in the area of at least one fluid-actuated movable wall of said booster to transmit a reaction force dependent upon a brake boosting force generated by said movable wall onto said pressure member in opposition to said pedal force; and
a tie element extending through said pressure member and said reaction device to transmit said boosting force onto said piston, said tie element carrying on its end disposed in said booster a stop disc against which said reaction device bears in the direction of said pedal force;
said reaction device including an annular reaction disc of elastic rubber material through which said tie element extends and which is disposed between said stop disc and stop surfaces of said movable wall and said pressure member.

16. A brake unit according to claim 15, wherein
said pressure member is a pressure sleeve communicating with said control element in the form of a control valve piston, said sleeve encompassing said tie element in the form of a tie rod, said tie rod adjacent said one end of said master cylinder being in engagement with said piston through at least one slot in said sleeve.

17. A brake unit according to claim 16, wherein
said tie rod adjacent said one end of said master cylinder is constructed like a hammer head having two radial extensions each of which extend through an associated slot open toward said one end of said master cylinder, each of said extensions engaging said piston adjacent said one end of said master cylinder.

18. A brake unit according to claim 15, wherein
said master cylinder is a tandem brake master cylinder having a primary piston and a secondary piston disposed in tandem, said primary piston being disposed adjacent said one end of said tandem master cylinder and said secondary piston being disposed intermediate said primary piston and said booster, said pressure member extending through said primary and secondary pistons and said tie member extending through at least said secondary piston and engaging said primary piston.

19. A brake unit according to claim 18, wherein
said primary piston defines a boundary of a primary chamber, said secondary piston defines a boundary of a secondary chamber, and further including
a hydraulic fluid reservoir communicating with said primary chamber and said secondary chamber via two ports disposed in a plane perpendicular to a longitudinal axis of said tandem master cylinder.

20. A brake unit according to claim 15, wherein said reaction device is disposed in a hub member of said movable wall, and
further including
a stop surface for said movable wall abutting an outer portion of said reaction device in a rest position in the form of an annular surface in said hub member, and
a stop surface for said pressure member capable of abutting an inner portion of said reaction device in the form of an annular end surface of said control element spaced from said reaction device in said rest position.

21. A brake unit according to claim 15, wherein said stop disc is axially adjustable.

22. A brake unit according to claim 21, wherein said stop disc is a stop nut screwed onto said tie element.

23. A brake unit according to claim 22, wherein said stop nut is a self-locking nut.

24. A brake unit according to claim 15, wherein said brake booster is a low-pressure booster having two movable walls in a tandem relationship connected to a common hub member.

25. A brake unit according to claim 24, further including
a stationary housing wall disposed between said two movable walls, said stationary wall and said hub member being interconnected by a rolling diaphragm.

26. A brake unit according to claim 15, wherein a portion of said master cylinder adjacent said one end thereof projects through said splashboard.

27. A brake unit according to claim 15, wherein said booster is a low-pressure booster having a working chamber connected to atmosphere via said control valve and a longitudinal channel disposed in a housing of said master cylinder between said control valve and an air intake port disposed on the side of said splashboard remote from said booster.

28. A brake unit according to claim 15, wherein said booster is a low-pressure booster having a working chamber connected via said control valve to an air intake port disposed in a housing of said master cylinder adjacent said booster.

29. A brake unit according to claim 15, wherein said booster is a low-pressure booster having a working chamber connected via said control valve to an air intake port disposed in an end wall of a housing of said booster adjacent said master cylinder.

30. A brake unit according to claim 15, wherein said control valve includes an axially movable control valve body having a sealing end surface capable of abutting an annular control edge of said control element and a concentric sealing surface of a hub member of said movable wall, said concentric sealing surface having two air passages each being partially circular leading to a low-pressure chamber of said booster and a radial channel disposed between each end of said two air passages leading to a work chamber of said booster.

* * * * *